Sept. 16, 1941.　　　　　G. MEYER　　　　　2,256,440
CONTROL MECHANISM FOR POWER OPERATED GEAR SHIFTING APPARATUS
Filed Oct. 30, 1937　　　4 Sheets-Sheet 3

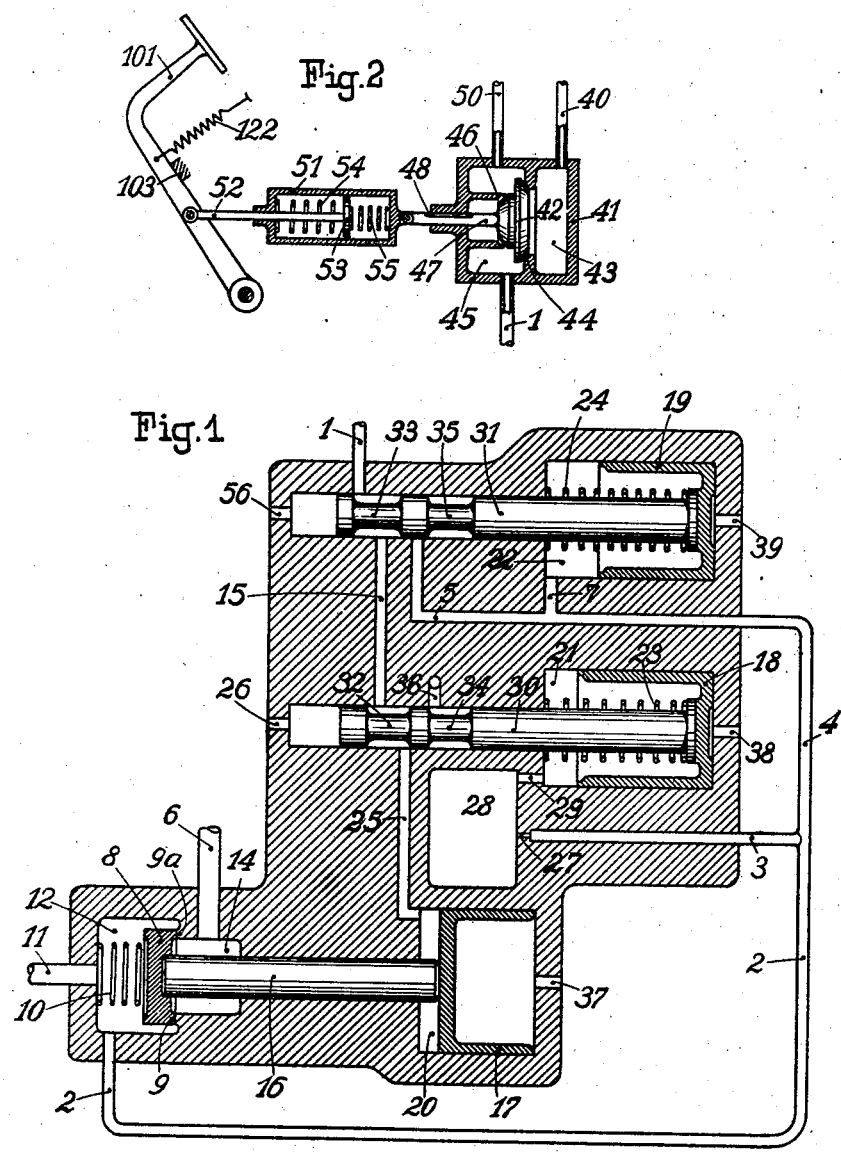

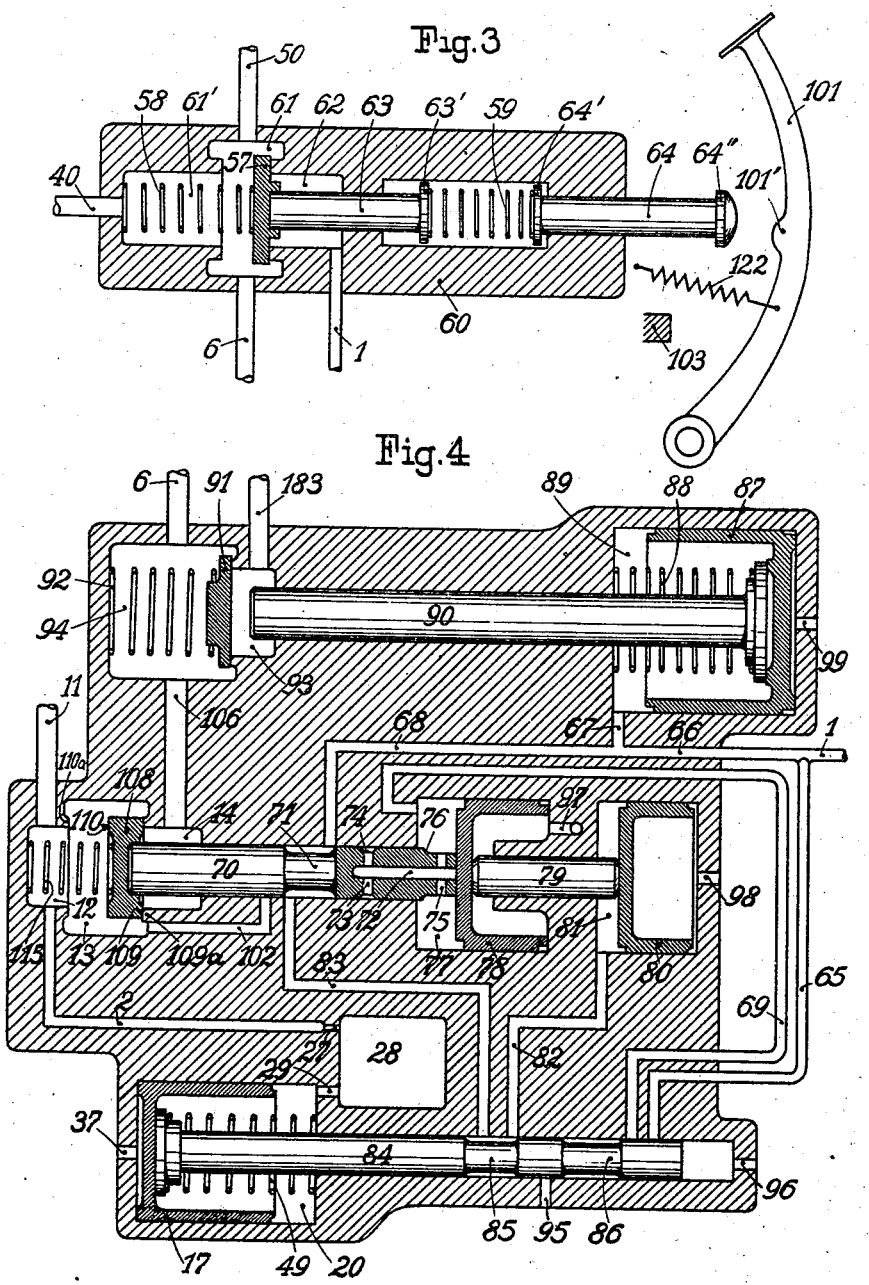

Inventor:
GUSTAV MEYER
Edmund H. Parry Jr.
Attorney

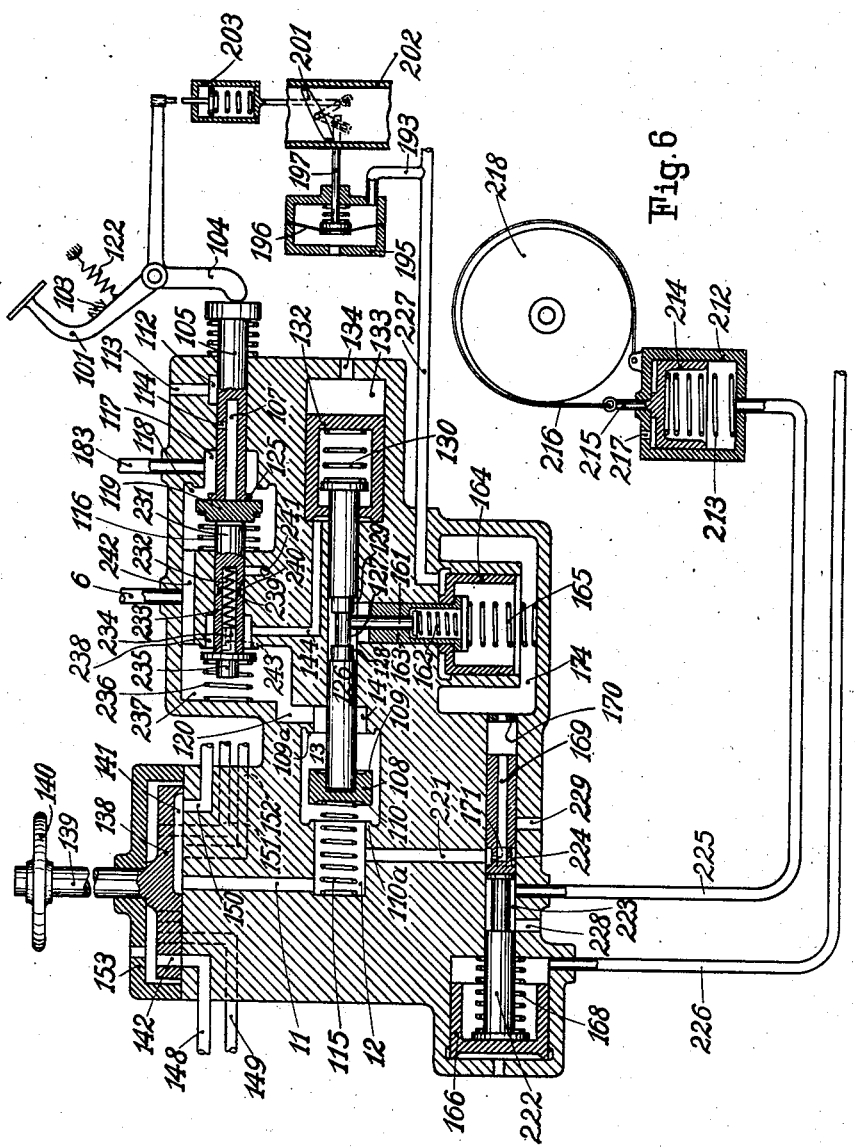

Patented Sept. 16, 1941

2,256,440

UNITED STATES PATENT OFFICE 2,256,440

CONTROL MECHANISM FOR POWER OPERATED GEAR SHIFTING APPARATUS

Gustav Meyer, Friedrichshafen, Bodensee, Germany, assignor to Maybach-Motorenbau G. m. b. H., Friedrichshafen, Bodensee, Germany Application October 30, 1937, Serial No. 172,019
In Germany October 31, 1936

14 Claims. (Cl. 137—139)

This invention is directed to a control device for the operating pressure medium of a pressure operated gear shifting mechanism, for use particularly with motor vehicle gear transmissions, the device being of the type which is initially rendered operative to supply pressure to the shifting mechanism through movement of an operating lever and which cuts off the pressure supply as soon as a gear shift has been effected. Such devices, as is known, involve a control valve for the shifting pressure supply which is actuatable by a suitable source of power in dependency on the position of the operating lever.

The general object of the present invention is to provide a control device of this character which will insure proper shifting of the gears in the transmission by the shifting mechanism, so that even though the gears fail to shift promptly due to difficulties in the transmission or because the shifting mechanism operates slowly because of sticking of the parts thereof or temporary insufficiency of the shifting pressure, the gear shifting operation will be successfully completed. The nature of the control mechanism is such that ordinarily the shifting mechanism will be caused to change the gear selection quite rapidly, but nevertheless proper shifting will be insured even though there be difficulties such as those mentioned tending to slow down the change from one gear selection to another.

The essential feature of the invention is that the supply of operating pressure to the gear shifting mechanism, once it has been initiated by movement of the control lever, will not be cut off until the shifting operation has been completed, and the cutting off of the supply is made dependent upon the shifting pressure. The valve in the control device for the shifting pressure, once it is open, is thereafter subject to control by the shifting pressure. The valve will be held open and then closed under control of the shifting pressure. A time delay in the closing of the valve is provided for, with the view the valve will remain open for a time sufficient for the transmission of adequate pressure to the shifting mechanism to complete a shifting operation. The period of delay can be quite short.

In some instances the shifting pressure may act directly on the valve actuating mechanism. In other instances the shifting pressure may act indirectly to control the holding of the valve in open position and the closing thereof through means provided for that purpose. The power for actuating the control valve may be a pressure medium from the same source, whether partial vacuum or superatmospheric, as the shifting pressure or from a different source.

While according to the invention the closing of the control valve for the shifting pressure will be dependent upon the shifting pressure itself, it may under some conditions be found desirable to provide additional means which will make the closing of the control valve also dependent upon other factors. It is a further feature of the invention to provide a multiple control which will insure the valve being held open and then closed at the proper time in dependency on both the shifting pressure and other factors such as conditions in the gear transmission itself during the shifting operation. Such latter arrangement is of particular utility in connection with gear transmissions employing toothed clutches for varying the gear selections, and in connection with which are provided auxiliary devices of known design to promote the rapidity of engagement of the gear parts by preliminarily slowing down a faster moving gear part and/or speeding up a slower moving gear part to sufficiently equalize their speeds that they will be ready to engage.

The invention may be more clearly understood by reference to the various control devices illustrated in the accompanying drawings and hereafter to be described. All of such embodiments are designed for use with gear shifting mechanisms wherein the operating pressure is a partial vacuum such as can be obtained from the intake manifold of a vehicle motor. In all instances, also, the power for actuating the control valve in at least one of its directions of movement is a pressure medium, and the actuating mechanism for the control valve is designed to employ partial vacuum although it will be understood that superatmospheric pressure is equally satisfactory for carrying out the principles of the invention.

In the drawings:

Figure 1 is a diagrammatic view, mostly in section, of one form of control device wherein according to the invention the shifting pressure control valve is closed in dependency on the shifting pressure;

Figures 2 and 3 are more or less diagrammatic views illustrating exemplary forms of lever devices and associated parts for initiating operation of control devices according to the invention such as in Figures 1 and 4;

Figure 4 shows a further embodiment of a control device according to the invention differing both in the construction of the control valve and the valve actuating mechanism from the arrangement shown in Figure 1;

Figure 5:
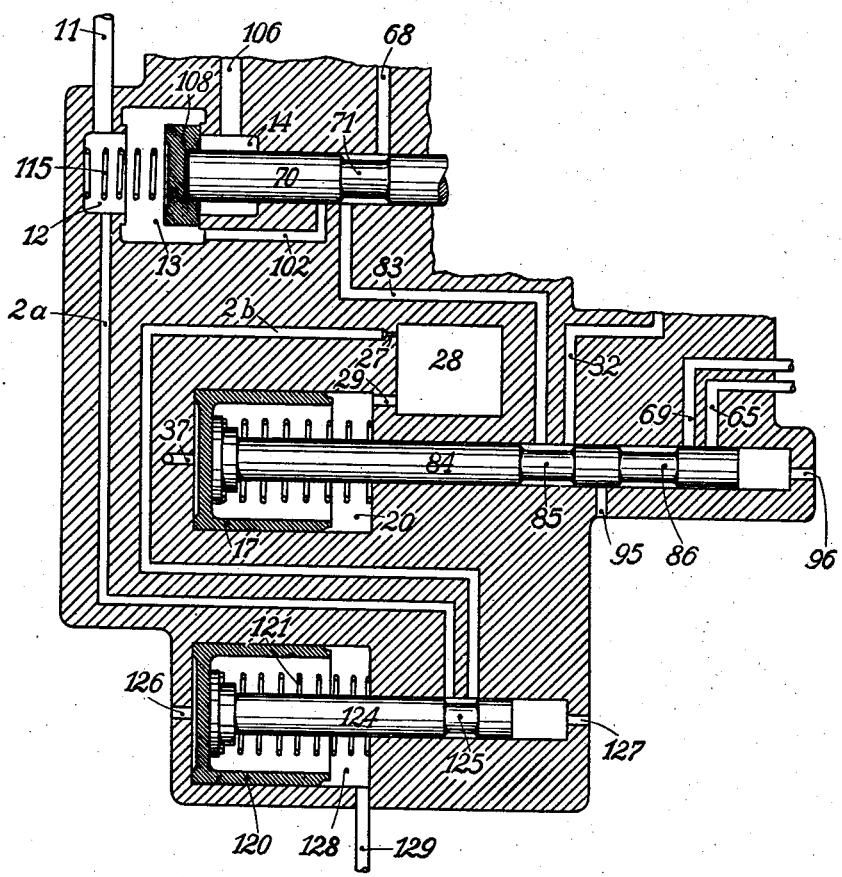

Figure 5 is a fragmentary view of a modification of the control device of Figure 4 wherein means is provided for controlling the closing of the shifting pressure control valve in dependency on some other factor as well as the shifting pressure; and Figure 6 illustrates a further form of control device utilizing a control valve similar to that in Figure 4 but employing a different form of valve actuating mechanism and utilizing a different arrangement for closing the valve in dependency on the shifting pressure, and, also, incorporating the feature of Figure 5 and certain additional features not found in the other views.

In Figure 1, 6 indicates a supply line from a suitable source of partial vacuum, and 11 is a line through which such operating pressure is transmitted to the pressure operated gear shifting mechanism (not shown) to be actuated. Line 6 opens into a small chamber 14 adjacent chamber 12. In the latter chamber is located the control valve 8 which is yieldingly held in its right end position against seat 9a by spring 10. In such position the valve cuts off chamber 14 and prevents the transmission of actuating pressure from line 6 to line 11. To open the valve pressure responsive actuating means is provided, which includes piston 17 in chamber 20 and slide rod 16. A port 37 is provided in the right end of chamber 20 and piston 17 is normally held in its right end position through valve spring 10.

Actuating pressure, here partial vacuum, from a suitable source enters the control device through line 1. As will be more fully understood from the subsequent description of Figures 2 and 3, the transmission of operating pressure through line 1 is made dependent on a lever operated valve which, when the lever is moved in one direction, will supply partial vacuum to line 1, and which when the lever is moved back in the other direction will cut off the supply. The operating pressure entering through line 1 passes through groove 33 in slide valve 31 into line 15, and from thence through groove 32 in slide valve 30 into line 25, and finally to chamber 20 to act on piston 17. With the position of the parts as shown in the drawings pressure is being supplied to chamber 20 and piston 17 is ready to move to the left to open valve 8 and allow the shifting pressure entering through line 6 to pass to the gear shifting mechanism through line 11.

Communicating with valve chamber 12 is a line 2 having two branches 4 and 3. Line 4 in turn has two branches 7 and 5. Branch 7 communicates with chamber 22 in which operates piston 19 for moving slide valve 31. A port 39 is provided in the right end of chamber 22, and a spring 24 serves to yieldingly hold piston 19 in its right end position. A port 56 is provided in the casing at the left end of slide rod 31. Besides groove 33 there is a second groove 35 in slide valve 31. The second branch, 5, of line 4 from valve chamber 12 is in the position shown by the portion of the slide valve between grooves 33 and 35. When such valve is moved to the left by piston 19, the actuating pressure line 1 is closed by the portion of the slide valve between grooves 33 and 35, and at such time line 5 is put in communication with line 15 through groove 35.

Besides line 4, line 3 branches from line 2 and receives therethrough shifting pressure from valve chamber 12. Line 3 opens through a throttling orifice 27 into a chamber 28, which in turn communicates through port 29 with chamber 21. In the latter chamber operates piston 18 for actuating slide valve 30. Port 38 is provided at the right end of chamber 21, and piston 23 is yieldingly held in its right end position by spring 23.

In the position of slide valve 30 shown, groove 32 provides communication between lines 15 and 25. When piston 18 moves such valve to the left, line 25 is vented to the atmosphere by means of vent port 36 through a second groove 34 in the slide valve. At the same time line 15 is closed by the portion of valve 30 lying between grooves 32 and 34. A port 26 is provided in the housing at the left end of slide valve 30. The various parts as shown in Figure 1 are in their rest positions. When the gear shifting mechanism is to be actuated to produce a change in the gear selection in a gear transmission, the lever heretofore referred to will be moved to cause partial vacuum to be transmitted through line 1. Such actuating pressure will immediately be transmitted through lines 15 and 25 to chamber 20 and piston 17 will quickly move to the left to open valve 8. Shifting pressure will then be supplied to line 11 from line 6.

As soon as valve 8 opens shifting pressure will be transmitted through line 2. Such pressure will pass through lines 4 and 7 into chamber 22 to quickly move piston 19 to the left, closing line 1 and establishing communication between lines 5 and 15 through groove 35. While the supply of actuating pressure from line 1 to piston 17 is cut off, shifting pressure from valve chamber 12 will now be transmitted through lines 2, 4, 5, 15 and 25 to chamber 20 to cause piston 17 to remain in its left end position. Thus, it will be seen that as contemplated by the invention once control valve 8 has been opened by the actuating pressure from line 1, it will thereafter be held open by the shifting pressure from line 6 and chamber 12.

At the same time that shifting pressure is transmitted through line 2 to branch 4, it is also transmitted through branch 3 to chamber 21 by means of chamber 28 and port 29. There is, however, some delay even though slight before sufficient partial vacuum is attained in chamber 21 to move piston 18 by reason of the small size of the throttling orifice 27. Orifice 27 is made sufficiently small as to insure the transmission of adequate pressure to the shifting mechanism through line 11 before piston 18 will be actuated. As soon as the vacuum pressure in chamber 21 reaches a sufficient degree, which will be after the gear shifting operation has been completed by the shifting mechanism, piston 18 will move to the left cutting off the supply of shifting pressure which has been transmitted through lines 5, 15 and 25 to the actuating piston 17 of control valve 8, and venting line 25 to the atmosphere through groove 34 and port 36. Thereupon the control valve 8 will close and piston 17 will move back to its right end position under action of spring 10. The supply of shifting pressure from line 6 is thus cut off from line 11 to the shifting mechanism and also from line 2. The partial vacuum transmitted to chambers 21 and 22 will be quickly dissipated by leakage through ports 38 and 39 and pistons 18 and 19 will move back to their right end positions under action of their springs. The control device is now ready for a new shifting operation as soon as the operating lever is depressed to again initiate the supply of actuating pressure through line 1.

It will be understood that the operation of pistons 19 and 18 depends on the shifting pressure which is present in chamber 12 as soon as valve 8 opens. Through slide valve 31 shifting pressure is supplied to directly act on piston 17 and hold valve 8 in its open position. After a time delay dependent on the condition of the shifting pressure and the size of orifice 27, piston 18 operates to cut off the supply of any vacuum to piston 17 and thereupon, as the result of the shifting pressure, control valve 8 closes.

Figure 2 shows one form of operator for the control device through which the action of the latter is initiated, the same comprising an operating lever and a valve controlling the supply of actuating pressure for initially opening the shifting pressure control valve. The lever 101 in its rest position is held against stop 103 by spring 122. Line 40 is a supply line from a suitable source of vacuum pressure which opens into chamber 43 of valve casing 41. 42 is a double valve, the larger conical end of which engages seat 44 in the rest position of lever 101 and closes off chamber 43 from valve chamber 45. In chamber 45 is located a valve seat 46 which engages the smaller conical end of valve 42 when the same is in its left end position. Line 1, as found in the embodiment of Figure 1, connects with chamber 45. Valve stem 47 is provided with a longitudinal groove 48, which, when the valve as shown engages seat 44, vents chamber 45 in line 1 to the atmosphere. In the left position of valve 42 groove 48 is cut off from chamber 45.

Valve stem 47 connects with casing 51 through a suitable pin. In such casing is located a piston, or a disc 53 fitted between two compression springs 54 and 55, and fixed to rod 52 which at its left end connects through a clevis with the operating lever 101.

Lever 101 may be the gas throttle lever for the vehicle motor or a lever provided solely for the present purpose. It is here assumed, however, that the lever is the clutch pedal of the motor vehicle. When the latter is the case and a pressure responsive servo device is used for actuating the clutch a second line, 50, extends from valve chamber 45 so that when valve 42 is moved to the left, vacuum pressure will be supplied to the clutch device through line 50 at the same time that operating pressure is supplied through line 1 to the control device for the gear shifting mechanism.

When pedal 101 is depressed from its rest position, spring 55 expands slightly while spring 54 is further compressed until the two opposing springs act equally against piston 53. As lever 101 is moved, therefore, shaft 47 is drawn to the left to move valve 42 from its right seat 44 to its left seat 46. Vacuum pressure from line 40 in chamber 43 is thereupon supplied to lines 1 and 50 through chamber 45 so that operation of both the control device, as shown in Figure 1, and the clutch actuating mechanism (not shown) is initiated. The throw of valve 42 is very short but after it reaches its left seat lever 101 can be further depressed through movement of piston 53 against spring 54.

When lever 101 is moved back in the opposite direction, piston 53 adjusts itself in casing 51 until the pressure of springs 54 and 55 is about equalized, and valve 47 is then moved back to its right seat 44. At such time vacuum pressure is cut off from chamber 45 and lines 1 and 50 are vented through groove 48. The clutch is reengaged by the venting of line 50 and the gear shifting mechanism control device is rendered inoperative by the venting of line 1.

A somewhat different arrangement is shown in Figure 3, although functioning for the same purpose as the arrangement shown in Figure 2. The operating lever is again indicated as 101 and having a stop 103 and a spring 122 for holding the same in its rest position. The vacuum pressure supply line 40 opens into a chamber 61' at the left end of valve chamber 61. In the latter operates a double acting valve 57. In its right position valve 57 closes off chamber 62 from chamber 61, and in its left position the valve closes off chamber 61' from chamber 61. Line 1 for supplying partial vacuum to the control device shown in Figure 1 extends from right hand chamber 62. The supply line which will connect with a suitable source of vacuum pressure opens into the left chamber 61'. The valve is yieldingly held against its right seat by spring 58 and is movable to its left seat through slide rods 63 and 64 between heads 63' and 64' of which is interposed spring 59. At the right hand end of rod 64 is a head 64'' which as lever 101 is drawn back to its rest position by spring 122 is engaged by ear 101' on the lever.

As in the case of Figure 2 the present device may be utilized to control operation of a servo clutch mechanism, and in such case line 50 connecting with the clutch operating mechanism will extend from valve chamber 61. Further, the device may be utilized to control the supply of shifting pressure which is supplied to the device of Figure 1 through line 6, and to the purpose the inlet end of line 6 communicates with valve chamber 61.

Lever 101 is shown in a depressed position, at which time vacuum is supplied from line 40 to both lines 6 and 50, but is cut off from line 1 since valve 57 is in its right end position. When lever 101 is released rod 64 will be moved to the left, and after spring 59 is somewhat compressed rod 63 will also move to the left to throw valve 57 against its left end seat at which time lines 6 and 50 as well as line 1 will be cut off from chamber 58 and line 40. When pedal 1 is again depressed rod 64 moves to the right, spring 59 somewhat expands, and rod 63 and valve 57 are moved to the right under the action of spring 58. During movement of valve 57 from its left to its right seat, partial vacuum is momentarily supplied to line 1. The control device is operated to produce a shifting operation of the shifting mechanism. Simultaneously vacuum is supplied through lines 6 and 50. The supply to the latter lines is continued after valve 57 reaches its end seat, but in the latter position the pressure to line 1 is cut off. The comparatively short period of supply of partial vacuum to line 1 suffices, however, to initiate the shifting operation, since it will be understood that the operation of the control device, as shown in Figure 1, is quite rapid.

In the several operating devices illustrated in Figures 2 and 3, the operating lever may also be connected to the supply valve mechanism through a frictional coupling connection as shown and described in Karl Maybach U. S. application Serial No. 160,916, filed August 25, 1937, instead of through the rod and spring lost motion mechanism here shown.

Figure 4 shows a control device wherein, according to the present invention, the shifting pressure control valve is held in open position and moved from open to closed position in dependency on the shifting pressure. Whereas in Figure 1 a single acting control valve is employed, in the present construction the control valve is of a double acting type in accordance with the general arrangement forming the subject-matter of the copending application of Karl Maybach, Carl Bottner, Eugen Glucker and Gustav Meyer, Serial No. 172,020, filed October 30, 1937. The control valve is moved from open to closed position and held in closed position by the same actuating pressure that initially, under movement of the operating lever, effects the opening of the valve, as in the copending application of Carl Bottner, Serial No. 172,021, filed October 30, 1937, but according to the present invention the valve is held in its intermediate open position in dependency on the shifting pressure and is moved from open to closed position subject to the control by the shifting pressure.

Referring now to Figure 4, the double acting valve controlling the supply of operating pressure to the gear shifting mechanism (not shown) is indicated at 108, the same being housed in a valve chamber 13. In its right end position face 109 of the valve engages valve seat 109a to close off a smaller chamber 14 from valve chamber 13. In the left end position of the control valve, valve face 110 will engage valve seat 110a to close off the smaller chamber 12 from chamber 13. Partial vacuum for operating the shifting gear mechanism will enter the control device through line 6 and passes therefrom through chamber 94 and passage 106 to the right chamber 14. When valve 108 is in open position the pressure medium from line 6 will be transmitted through chambers 14, 13 and 12 to conduit 11. The pressure responsive gear shifting mechanism and the pressure distributing valve mechanism for effecting selective operation thereof to produce different gear selections in a motor vehicle gear transmission are well known in the art and have not been shown. It will be understood that conduit 11 supplies operating pressure thereto under control of valve 108.

Valve 108 is supported by a slide rod 70 and is normally held in its right end position by spring 115. The valve actuating mechanism includes piston 78 slidable in chamber 77 which acts against the right end of rod 70, and a second piston 80 in chamber 81 which through slide pin 79 serves to move piston 78, rod 70 and valve 108. Chamber 81 is of less depth than chamber 77 so that piston 80 has a shorter stroke than piston 78.

Actuating pressure, here partial vacuum, for initiating opening of valve 108 is supplied through line 1 under control of an operating lever through an arrangement such, for example, as illustrated in Figure 2 or 3. The operating pressure in line 1 is transmitted through its branch 66, and through lines 68, 83 and 82 to chamber 81. Piston 80 is thereupon moved to its left end position to move valve 108 to its intermediate open position in chamber 13. Shifting pressure from line 6 is thereupon transmitted through line 11 to the gear shifting mechanism. When valve 108 reaches its intermediate open position, groove 71 in slide rod 70 is cut off from line 68, but such groove now provides communication between line 102 extending from valve chamber 13 and line 83. Shifting pressure supplied from line 6 and available in chamber 13 is then supplied through lines 102, 83 and 82 to chamber 81 to act on piston 80 and hold valve 108 in its intermediate open position against the force of spring 115.

The actuating mechanism for valve 108 is caused to operate in dependency on the shifting pressure through the slide valve arrangement shown in the lower portion of the housing. Therein is located a slide valve 84 having therein a groove 85 which establishes communication between lines 83 and 82 when valve 108 is initially moved from its right closed end position to intermediate open position by its actuating mechanism upon movement of the operating lever. A piston 17 is provided at the left end of rod 84 in chamber 20, and the same is normally held in its left end position by spring 49. Line 2 communicating with chamber 12 at the left of valve chamber 13 supplies shifting pressure, here partial vacuum, from line 6 to chamber 20 of piston 17 through a throttling orifice 27, chamber 28 and port 29. When valve 108 has been moved to its open position by piston 80 partial vacuum is transmitted through line 102, and after a short time the vacuum reaches a point in chamber 20 to cause piston 17 to move to the right. The delay in the operation of piston 17 after valve 108 is opened is determined by the size of orifice 27, and with the view that valve 108 will not be allowed to close until after sufficient shifting pressure has been transmitted through line 11 to cause operation of the shifting mechanism.

The closing of valve 108 by movement on to its left end position will occur when sufficient shifting pressure acts in chamber 20 to move piston 17 to the right. In the right position of piston 17 a groove, 86, in slide valve 84 provides communication between a second branch, 65, of the actuating pressure supply line 1 and line 69 which leads to chamber 77 of the second piston 78. Partial vacuum from line 1 is thus transmitted to move piston 78 to the extreme left, thereby moving the control valve 108 against its left end seat 110a. The supply of shifting pressure from line 6 to line 11 is thus cut off. Similarly the supply of shifting pressure acting on piston 17 is also cut off.

When rod 70 has moved valve 108 to its closed end position, the partial vacuum existing in chamber 20 will be rather quickly dissipated by leakage through port 37 around the piston 17. Thereupon piston 17 will be moved back to its left end position through spring 49, thus closing valve 86 and cutting off the supply of vacuum to piston 78 through line 69. On the other hand, when valve 108 has reached its left end position, radial bore 73 and its surrounding annular groove 74 are in registry with line 68, and through the axial bore 72 and the second radial bore 75 actuating pressure from the first branch, 66, of line 1 is supplied to chamber 77 to hold piston 78 in its left position and maintain valve 108 in its left closed end position against the action of spring 115.

Through the arrangement as described it will be seen that the actuating pressure, partial vacuum, which is supplied through line 1 upon movement of the operating lever in one direction, initially acts through lines 66, 68, 83 and 82 and piston 80 to move the shifting pressure control valve 108 from its right closed end position to intermediate open position, and such same actuating pressure, following movement of piston 17 to the right, then acts through lines 65 and 69 and the second piston 78 to move the control valve from its intermediate open to its left closed end position. Finally, when valve 108 has reached the latter position and piston 17 has again moved to the left, actuating pressure, now through lines 66 and 68, and bores 73, 72 and 75, continues to act on piston 78 to hold the control valve 108 in its left closed end position. It will be observed that once the operating lever has been depressed to initiate the supply of actuating pressure through line 1, no further movement of the lever has been necessary since the distribution of the actuating pressure for causing the closing of the control valve, and the maintenance of such valve in its left position, is entirely automatic by reason of the provision of the arrangement just described. It will further be understood from the following explanation that when the actuating pressure has disappeared valve 108 may be again opened by movement from its left end position to its intermediate position under the action of spring 115 to permit a further shifting operation without repeating the movement of the operating lever in its original direction.

If, with valve 108 in its left end position, the driver now returns the operating lever to its rest position, line 1 is vented. The partial vacuum existing in chamber 77 is thus dissipated through bores 75, 72 and 73, and lines 68, 66 and 1. Piston 78 then moves partially to the right under the action of spring 115 until valve 108 reaches its intermediate open position. At such time shifting pressure from chamber 13 is transmitted through lines 102, 83 and 82, so that piston 80 is in its left end position and prevents valve 108 from moving on to its right end closed position. A further shifting operation is possible while valve 108 is in its open position. After the valve is opened, partial vacuum from chambers 13 and 12 acts through line 2 and in a very short time causes piston 17 to move to the right. At such time groove 85 in slide rod 84 is cut off from line 83 and connects line 82 with port 95. The partial vacuum existing in chamber 81 is thus dissipated releasing valve 80 and allowing the control valve 108 to be moved against its right end seat under the action of spring 115.

The shifting cycle has now been completed and valve 108 will not be further actuated until the operating lever is again moved in its first direction, as originally, to supply partial vacuum through line 1 to cause opening of the valve through piston 80 and the subsequent closing of the valve through piston 78.

Where it is desired to control operation of the vehicle clutch through the same operating lever as initiates action of the control device, a control valve for the clutch mechanism may be incorporated in the control device proper, in lieu of the arrangement of the clutch pressure supply line 50 in association with the lever operated valves in the constructions shown in Figures 2 and 3. This is illustrated in the upper portion of the embodiment of Figure 4. Valve 91 in chamber 94 is yieldingly held against its seat by spring 92. Extending from chamber 93 to the right of chamber 94 is a vacuum pressure line 183 which will connect with the clutch actuating device. In chamber 89 is an actuating piston 87 yieldingly held in its right end position by a spring 88. Port 99 communicates with chamber 89 at the right end of the piston, and line 67 opening off of branch 66 of the actuating pressure line 1 communicates with the left end of chamber 89. When an operating lever, such as shown in Figure 2 or 3, except with line 50 omitted, is depressed to supply partial vacuum through line 1, such vacuum causes piston 87 to move to the left. Through slide rod 90 the clutch control valve 91 is raised off of its seat at the same time pressure is transmitted through lines 66, 83 and 82 to operate piston 80. Thereupon pressure from line 6 is transmitted through line 83 to actuate the clutch at the same time valve 108 is opened to supply pressure through line 11 to operate the gear shifting mechanism. Again, when the operating lever is released to vent line 1, chamber 89 is similarly vented. Piston 87 thereupon moves to the right and allows valve 91 to close under the action of its spring 92 so that no further operating pressure is transmitted to the clutch mechanism.

In Figure 4, in addition to the parts heretofore described, there is a series of ports 96, 97 and 98, the same respectively communicating with the chambers at the right ends of slide rod 84, piston 78 and piston 80 so that such parts may be operated satisfactorily without adverse pressure influences.

In some cases it may be desirable to hold the shifting pressure control valve in open position and allow the same to move on to closed position in dependency on an additional factor besides the shifting pressure itself. An arrangement for such purpose is shown in Figure 5 as applied to a control device of the construction of Figure 4 just described. As in Figure 4 the shifting pressure from valve chamber 13 controls slide valve 84 through piston 17 in chamber 20. In the present case, however, the passage of shifting pressure from valve chamber 13 after opening of the shifting pressure control valve 108 is subject to control by a slide valve 124 interposed between lines 2a from chamber 12, and line 2b through which the shifting pressure is transmitted through throttling orifice 27, chamber 28 and port 29 to chamber 20 of piston 17.

Slide valve 124 is actuatable by piston 120 in chamber 128. In the position shown piston 120 is yieldingly held in its left position by spring 121. A vacuum pressure line 129 communicates with the right end of chamber 128. Groove 125 in slide valve 124 provides communication between lines 2a and 2b, and in the position shown shifting pressure will be supplied as soon as valve 108 opens to gradually build up in chamber 20 and actuate piston 17. However, if and when vacuum pressure is supplied through line 129, piston 120 moves slide valve 124 to the right to cut off the supply of shifting pressure to line 2b. Such pressure can not act on piston 17 to move slide valve 84 to the right and effect closing of control valve 108, as heretofore explained, until line 129 is vented and slide valve 124 moves back to its left position. Ports 126 at the left end and piston 120 and 127 at the right end of slide valve 124 provide for the proper operation of these parts by avoiding the effect of adverse pressure influences. Port 126 additionally provides for the dissipation of vacuum pressure existing in chamber 128 around piston 120 when the supply through line 129 is cut off.

The arrangement shown in Figure 5 is useful in enabling the closing of the shifting pressure control valve 108 to be controlled in dependency on conditions in the gear transmission during the shifting operation. It is desirable, of course, that control valve 108 should not close until the gear parts which are to provide the new gear selection have been brought into complete engagement. Through known devices arrangement may be made to supply partial vacuum through line 129 to effect closing of slide valve 124 during the time the shifting operation is in progress and the cutting off of the supply through line 129 as soon as engagement of the gear parts has been completed, whereupon with the dissipation of vacuum in chamber 128 piston 120 will move to the left to allow the shifting pressure transmitted through line 2a to act on piston 17 in the manner heretofore described.

To facilitate the completion of the shifting operation in gear transmissions it has heretofore been proposed, as for example in German Patents 569,392 and 569,393, to Maybach-Motorenbau, G. m. b. H., to provide auxiliary devices for rapidly equalizing the speeds of the several gear parts to be engaged and thus hasten completion of the shifting operation. Such auxiliary devices on the one hand may be caused to speed up the slower moving gear part, and on the other to slow down the faster moving gear part. Where a vacuum pressure operated auxiliary device is provided to slow down a slower moving gear part, line 129 may be connected therewith so as to simultaneously receive a vacuum supply and be vented when such device is vented after the respective gear parts are brought to the same speed and come into final engagement.

In the embodiment of Figure 6 the shifting pressure control valve is of the double acting type as in the embodiment of Figure 4. Another form of actuating mechanism is utilized to operate the valve, and there is a different arrangement for holding the control valve open and subsequently providing for the closing thereof in dependency on the shifting pressure. Also, the parts, which in the embodiments of Figures 2 and 3, are constructed separately, in the present construction are built into the casing of the control device. There are further differences from the embodiment of Figure 4 as hereafter explained.

Referring now to Figure 6, the shifting pressure control valve is as before designated 108 and operates in chamber 13. In its right end position such valve again through seat 109 engages seat 109a to close off chamber 14, and its left end position through engagement of its seat 110 with seat 110a closes off chamber 12. Also, spring 115 tends to yieldingly hold valve 108 against its right end seat. Partial vacuum is supplied from a suitable source through line 6 and is transmitted through passage 242, chamber 237 and angular passage 120 to chamber 14 at the right of valve chamber 13. Line 6 also, in the present construction supplies partial vacuum for operating the actuating mechanism of the control valve.

For the latter purpose a valve 235 is provided in chamber 237 which in its right end position closes a small chamber 238 through the action of spring 236. Valve 235 has a stem 234 supported in bore 232 of a slide rod 231. The operating lever 101 is here indicated as constituting the gas pedal of the vehicle motor, the same operating through the spring device 203 to actuate the gas throttle 201. The lever is held in its rest position against stop 103 by spring 122.

Fixed to lever 101 is an arm 104 which acts against the head of slide rod 105. When lever 101 is in its rest position against stop 103 slide rod 105 is in its left position as shown, and when lever 101 is depressed rod 105 moves to the right. Rod 105 acts through slide rod 231 to hold valve 235 open. Under such conditions pressure from line 6 passes through chamber 237 to chamber 238 and thence through line 144 to the actuating mechanism of the control valve 108 hereafter to be described.

When operating lever 101 is depressed slide rod 231 moves to the right with rod 105 under the action of spring 236, causing valve 235 to close. An angular bore 243 at the left end of rod 231 is uncovered by movement of such rod to the right relative to the now stationary stem 234 of valve 235. In the same movement a radial bore 239 connecting with groove 240 is brought into registry with a vent 241. The operating pressure, here partial vacuum, previously existing in line 144 and chamber 238 is thereby dissipated through bores 243, 232, 239 and vent 241.

The pressure responsive means for actuating the shifting pressure control valve 108 comprises a slide rod 126, the right hand portion of which extends into an actuating piston 132 disposed in chamber 133. A head at the end of rod 126 is yieldingly held in engagement with the left end of piston 132 by spring 130. A vent 134 opens into the right end of chamber 133. Line 144 which supplies partial vacuum from line 6 under control of valve 235 and lever 101 connects with the left end of chamber 133. The transmission of vacuum pressure through line 144 causes piston 132 to move to the left end position, in which it is shown, whereupon rod 126 urges valve 108 from its right towards its left seat. When the vacuum pressure in line 144 is vented, spring 115 tends to move valve 108, rod 126 and piston 132 towards their right end positions.

During movement of valve 108 in either direction between its right and left closed end positions, the valve is temporarily held in its intermediate open position in dependency on the shifting pressure. In the present case positive locking mechanism acting on slide rod 126 is provided, the same being controlled by the shifting pressure. Such mechanism includes a latch pin 161 supported by a spring 162 in the upwardly projecting portion 163 of a piston 164. Piston 164 is supported by suitable guide means in chamber 174 by a spring 165.

In rod 126 is a deep groove 127 bordered on each side by the respective shallower grooves 128 and 129. When piston 108 is in its right end position latch pin 161 engages groove 128, and in the left end position of the valve the pin engages groove 129. During the course of movement of the valve in either direction, pin 161 under the action of spring 162 drops into the deep groove 127 so as to temporarily hold valve 108 in its intermediate open position. Valve rod 126 can not then move to either closed end position until latch pin 161 is released from groove 127 through downward movement of piston 164 through the shifting pressure as will hereafter be explained.

When valve 108 is in its intermediate open position shifting pressure transmitted from line 6 to chamber 14 enters chamber 13 and passes into chamber 12. From chamber 12 pressure is transmitted through line 11 to actuate the shifting mechanism. The gear speed selecting valve device for so distributing the shifting pressure to the parts of the shifting mechanism that different gear selections can be brought about at will is shown in the present instance in association with the control device housing. Lines 148, 149, 150, 151 and 152 represent lines leading to the different pressure responsive motors of the gear shifting mechanism. Certain of such lines are supplied with shifting pressure from line 11 through suitable grooves 141 in a distributor valve disc 138 which is rotatable by shaft 139 as by means of wheel 140. Other of the lines will at the same time be vented to the atmosphere through ports such as 142 and a vent in the top housing 153. By rotating the distributor disc 138 to different settings the supply of partial vacuum to and the venting of the lines to the different shifting motors may be changed to correspond to different gear selections.

At the same time that partial vacuum is supplied through line 11 upon the opening of valve 108, partial vacuum is simultaneously supplied through line 221, slide valve 222 and throttling orifice 170 to chamber 174. Slide valve 222 has therein an axial bore 169 which in the position of the valve shown communicates through a radial bore 171 and annular groove 224 with line 221. The flow of partial vacuum into chamber 174 is retarded by throttling orifice 170 with a view that there will be a time delay, though very slight before the degree of vacuum in the chamber will be sufficiently great to cause piston 164 to move downwardly for the purpose of releasing latch pin 161 and allowing slide rod 126 to move to close valve 108.

It will be seen that latch pin 161 serves to hold valve 108 in its intermediate open position and releases to allow the valve to close in dependency on the shifting pressure which acts through piston 164. As in the embodiment of Figure 5, however, the period valve 108 remains open and the time the valve closes are made dependent on additional factors than the shifting pressure through the provision of slide valve 222, heretofore mentioned, which controls the supply of shifting pressure to chamber 174, and, secondly, through the provision of a vacuum pressure supply line 227 connecting with a space at the upper end of piston 164, to hold the piston in raised position. Slide valve 222 is yieldingly held in its left position by spring 168, at which time shifting pressure from line 221 is transmitted to chamber 174, and is provided with an actuating piston 166 responsive to vacuum pressure introduced through line 226 to cut off line 221 and vent chamber 174 through bores 170 and 171 of slide valve 222 and a port 229 in the housing which in the right hand position of the slide valve registers with bore 171.

It will be seen that when vacuum pressure is supplied through either or both of lines 226 and 227 piston 164 will remain in its raised position and operate through latch pin 161 to hold the shifting pressure control valve 108 in the open position shown in the drawings. Vacuum pressure supplied through line 227 acts directly on piston 164 and coacts with spring 165 to hold the piston up even though slide valve 222 is in its left position so that shifting pressure from line 221 is being supplied to chamber 174 to act on the lower end of the piston. Again, when vacuum pressure is supplied through line 226 slide valve 222 is held in its right end position so that shifting pressure from line 221 is cut off and piston 164 can not then move downwardly regardless of whether or not vacuum pressure is being supplied through line 227.

The factors which will control the supply of partial vacuum through lines 226 and 227 will preferably be conditions in the gear transmission itself during the shifting operation. It is known to provide auxiliary devices in connection with gear transmissions for speeding up the slower and slowing down the faster of two gears so that the toothed clutch parts through which such gears are brought into driving engagement can be brought to final engagement more rapidly. In German Patent 569,392 of Maybach-Motorenbau, for example, is shown an auxiliary device for slowing down a faster moving gear part through a pressure responsive brake controlled by a valve which opens to supply braking pressure preparatory to engagement of the gears to be connected and which closes to discontinue the braking action when the clutch portions of the respective gears have moved into final engagement. Again, in German Patent 569,393 of Maybach-Motorenbau is shown an arrangement through which the vehicle motor is accelerated to increase the speed of a slower moving clutch part under control of a similar type valve which opens preliminarily to final engagement of the clutch portions of the gears and closes to slow down the vehicle motor when the gears have been brought into final engagement. Such types of devices are diagrammatically illustrated in Figure 6. A servo motor 212 has therein a piston 214 normally held in its raised position by spring 213. Above the piston is a vent 217. Piston rod 215 upon downward movement of the piston serves to tighten a brake band 216 against a disc 218, which disc is connected to the vehicle drive shaft between the main clutch and the gear transmission. Through such braking action a faster moving gear part in the transmission may be slowed down. In the present instance, the vacuum pressure for effecting operation of piston 214 is supplied through line 225 from line 221 when slide valve 222 is in its right end position, at which time groove 223 establishes communication between lines 221 and 225. When slide valve 222 is in its left end position as shown, line 225 is vented to the atmosphere through port 228, and at such time piston 214 is in its raised position and brake 216 is released. It will be noted that by reason of the arrangement of groove 223 and port 171 in slide valve 222 operating pressure is supplied through line 225 to the braking piston 214, and to chamber 174 to act on piston 164, alternately in the opposite end positions of slide valve 222. When pressure is being supplied through line 225 chamber 174 is being vented through bore 171 and port 229. When pressure is being supplied through bore 171 to chamber 174, line 225 is vented through port 228.

The supply of vacuum to and venting of line 226 for moving piston 166 of slide valve 222 back and forth will be subject to a control such, for example, as valve 43 in Figure 5 of German Patent 569,392. As therein shown, the valve will open to supply vacuum pressure in response to movement of the clutch parts of the gears to be engaged, and the valve will close as soon as the parts have been finally engaged. With the present arrangement vacuum pressure from a suitable source will be supplied through line 226 preparatory to engagement of the gear parts. Piston 166 will then cause slide valve 222 to move to the right and, assuming that the shifting pressure control valve 108 is now open, vacuum pressure will be supplied through lines 221 and 225 to effect operation of the braking device parts 214 and 216. As soon as the gear parts have been engaged the supply of vacuum to line 226 will be cut off, and piston 166 will move back to the left venting line 225 and disengaging the braking device. At such time line 221 will be connected to chamber 174 and piston 164 is ready to move down as soon as the vacuum reaches a sufficient degree to release latch pin 166 and allow the shifting pressure control valve 108 to close.

Line 227 like line 226 will be supplied with vacuum pressure from a suitable source under control of a valve which will open preliminary to engagement of the clutch parts of the transmission gear to be engaged. At such time, through line 193 branching off of line 227, vacuum pressure is supplied to diaphragm 196 of the pressure responsive device 195. Such diaphragm through rod 197 serves to open gas throttle valve 201 in carburetor 202, this being accomplished by reason of the spring device 203 without affecting the gas pedal 101. When as a result the slower moving gear part has been speeded up through the vehicle motor and the two gear parts finally engaged, the control valve for line 227, which may be similar to control valve 20 in Figure 1 of German Patent 569,393, will close and line 227 will be vented. The throttling valve 201 will close to slow down the motor.

At the same time vacuum is supplied through branch 193 to open the throttle valve 201, vacuum is supplied through line 227 to act on the upper side of piston 164. Until line 227 is vented upon complete engagement of the gears, piston 164 is held in its upper position so that through latch pin 161 the shifting pressure control valve 108 remains open to continue the supply of shifting pressure to the gear shift mechanism. If, when line 227 is vented, slide valve 222 is in its left end position and vacuum already exists in chamber 174, piston 164 will immediately move down and valve 108 will close. If slide valve 222 is in its right end position vacuum pressure can not be supplied to chamber 174 until the valve moves to the left so that there will be a time delay before piston 164 moves downwardly to effect the closing of valve 108.

The complete operation of the device shown in Figure 6 will now be described. Assuming that the gas pedal 101 is depressed, as during normal driving, slide pins 105 and 231 are in their right hand positions and valve 235 is closed. The shifting pressure control valve 108 will be in its right closed end position against seat 109a. Shifting pressure is cut off from the gear shifting mechanism and also from the actuating mechanism for valve 108. If now pedal 101 is released, slide rods 105 and 231 move to the left. It will be noted that the movement of slide pin 105 besides opening valve 235 also opens a second valve 119 disposed between the adjoining ends of rods 105 and 231. Chamber 117 is thus opened to the supply of partial vacuum from line 6. Through line 183 vacuum pressure may thus be supplied to operate a servo device for the main vehicle clutch. Valve 119 during the time lever 101 was depressed closes off chamber 117 from chamber 118, end 125 of rod 105 moves to the right away from valve 119, and line 183 to the clutch device is vented to the atmosphere through grooves 107 and 114 in rod 105, and groove 112 and port 113 in the housing. Spring 116 tends to hold valve 119 against its seat. At the same time that vacuum is supplied through line 183 through valve 119 to operate the vehicle clutch, partial vacuum from line 6 is transmitted from chamber 237 to chamber 234 and thence through line 144 to move piston 132 to the left. Slide rod 126 under the action of the piston moves the shifting pressure control valve 108 away from its right end seat to the intermediate open position shown. At such time latch pin 161 drops into groove 127 so that valve 108 is held in its open position. Shifting pressure from line 6 accordingly passes through chamber 237, passage 120, chambers 14, 13 and 12 to line 11, and from thence to the gear shifting mechanism.

The release of latch pin 161 will not occur until shifting pressure from chamber 12 is supplied through line 21 and slide valve 222 to chamber 174. Assuming that during the course of operation of the shifting mechanism vacuum pressure is supplied to line 226, piston 166 and slide valve 222 quickly assume their right hand position and vacuum pressure from line 221 is supplied through groove 223 and line 225 to operate the braking device 216. At such time the supply of vacuum pressure is cut off from piston 164. When the gear parts have reached final engagement, the supply of vacuum to line 226 will be cut off and the vacuum pressure acting on piston 166 will be vented. Slide valve 222 will move to its left hand position, venting line 225 through port 228 and releasing the braking device 216. At such time vacuum pressure from line 221 will be transmitted through bores 171 and 169 to chamber 174. As soon as the vacuum in chamber 174 has reached a sufficient degree, the delay being determined by the size of throttling orifice 170, piston 164 will be ready to move downwardly.

During the shifting operation, it has been assumed that the vehicle motor has been speeded up to accelerate the slower moving gear part to be engaged. Until the gears have been finally engaged vacuum pressure will exist in line 227 to hold piston 164 in its raised position. If, therefore, vacuum still exists in line 227 when vacuum exists in chamber 174, piston 164 can not move downwardly until line 227 is vented. That is to say, the auxiliary devices for both speeding up and slowing down the respective gear parts to be engaged must both have been rendered inoperative before shifting pressure supplied to chamber 174 can cause piston 164 to move downwardly. When the latter does occur, latch pin 161 will be released from groove 127 and slide rod 126 will move control valve 108 into engagement with its left end seat 110a under the action of spring 130.

When valve 108 has reached its closed position, the supply of shifting pressure will be cut off from line 11. Similarly the supply to line 221 will be cut off. The vacuum previously acting in chamber 174 will shortly be dissipated so that latch pin 161 will be caused to bear against groove 129.

Assuming now that pedal 101 is depressed, valve 235 will close and the supply of shifting pressure will be cut off from line 144. At such time bore 239 will be brought in registry with vent 241, groove 243 will be uncovered, and through such series of openings and line 144, the vacuum acting on piston 132 will be dissipated. Valve 108 will accordingly move from its left end position towards the right under the action of spring 115. Pin 161 will again drop in groove 127 to momentarily hold valve 108 in its open position. Shifting pressure will again be supplied to the shifting mechanism, but no further operation thereof will occur unless before the pedal is released a new gear selection has been set. Valve 222 will be in its left position and vacuum will be supplied through line 221 to move piston 164 downwardly. As soon as the latter occurs control valve 108 will move on back to its right end closed position.

It will be understood, of course, that depression of lever 101 not only closes valve 235 to effect operation of the control device parts as just explained, but at the same time closes valve 119 and causes the vehicle clutch to be engaged by venting of line 183 through port 113 and bores 107 and 114. The shifting cycle is now complete.

It will be understood that while in Figure 6 the closing of the shifting pressure control valve 108 has been made dependent upon both an auxiliary slowing down device and an auxiliary speeding up device for the gear transmission, both of such devices in practice may not in fact be used with the same transmission. Figure 6, however, illustrates that the control device of the present invention may include provision for effecting the closing of the shifting pressure control valve in dependency on either or both of such types of auxiliary devices in accordance with the conditions prevailing in the gear transmission as well as in dependency on the shifting pressure itself.

The invention may be embodied in a variety of different forms as will be evident from the several different constructions herein shown and described. The protection afforded the invention is therefore to be determined from the scope of the appended claims since the embodiments disclosed are merely illustrative.

I claim:

1. A control device for pressure-operated gear shifting mechanism including a valve for controlling the supply of shifting pressure to the shifting mechanism, actuating means for said valve responsive to an actuating pressure, means operating independently of the shifting pressure for supplying pressure to the valve actuating means to open the valve and means responsive to the shifting pressure controlling the further supply of actuating pressure to the valve actuating means.

2. A control device for pressure-operated gear shifting mechanism including a valve for controlling the supply of shifting pressure to the shifting mechanism, a supply of actuating pressure, means operating independently of the shifting pressure controlling said supply, and actuating means for said valve actuatable by said actuating pressure to open the valve and acted on thereafter by the shifting pressure to hold the valve open.

3. A control device for pressure-operated gear shifting mechanism including a valve for controlling the supply of shifting pressure to the shifting mechanism, actuating means for the valve operated by an actuating pressure, lever-operated means operating independently of the shifting pressure for initiating the supply of actuating pressure to the actuating means, and control means responsive to the shifting pressure for cutting off the supply of actuating pressure to the actuating means.

4. A control device for pressure-operated gear shifting mechanism including a valve for controlling the supply of shifting pressure to the shifting mechanism, pressure-operated actuating means for the valve, lever-operated means for initiating the supply of pressure to the actuating means to open the valve, and means responsive to the shifting pressure becoming operative when the valve has opened for controlling the further supply of pressure to the actuating means for closing the valve independently of the lever operated means.

5. A control device for pressure-operated gear shifting mechanism including a valve for controlling the supply of shifting pressure to the shifting mechanism, pressure-operated actuating means for the valve, lever-operated means operating independently of the shifting pressure for initiating the supply of pressure to the actuating means for opening the valve, and valve means responsive to the shifting pressure coming into operation when the valve opens and controlling the further supply of pressure to the actuating means for closing the valve.

6. A control device for pressure-operated gear shifting mechanism including a valve for controlling the supply of shifting pressure to the shifting mechanism, pressure-operated actuating means operated by an actuating pressure to open the valve, valve means responsive to the shifting pressure becoming operative upon the opening of the valve to cut off the supply of actuating pressure and to cause shifting pressure to act on the actuating means to hold the valve in open position, and further valve means operating in dependency on the shifting pressure controlling the closing of the valve.

7. A control device for pressure-operated gear shifting mechanism including a valve for controlling the supply of shifting pressure to the shifting mechanism, pressure-operated actuating means for the valve, lever-operated means operating independently of the shifting pressure for initiating the supply of pressure to the actuating means for opening the valve, and a control member actuatable by the shifting pressure controlling the supply of pressure to the valve actuating means.

8. A control device for pressure-operated gear shifting mechanism including a valve for controlling the supply of shifting pressure to the shifting mechanism, lever controlled means operating independently of the shifting pressure to open the valve, pressure-responsive means for holding the valve open and a control member responsive to the shifting pressure controlling the supply of pressure to said pressure-responsive means.

9. A control device for pressure-operated gear shifting mechanism including a valve for controlling the supply of shifting pressure to the shifting mechanism, lever controlled means operating independently of the shifting pressure to open the valve, pressure-responsive actuating means for the valve, and means controlling the supply of pressure to the actuating means operating in dependency on the shifting pressure to delay the closing of the valve.

10. A control device for pressure-operated gear shifting mechanism including a valve for controlling the supply of shifting pressure to the shifting mechanism, pressure-operated actuating means for moving the valve from closed to open position, further pressure-operated actuating means for moving the valve from open to closed position, and control means operated by the shifting pressure alternately supplying pressure to the several actuating means.

11. A control device for pressure-operated gear shifting mechanism including a valve for controlling the supply of shifting pressure to the shifting mechanism, actuating means for the valve, control means operable by the shifting pressure controlling the closing of the valve, a pressure supply line, and pressure operated valve means operated independently of the shifting pressure by pressure supplied by said line temporarily preventing delivery of shifting pressure to said control means.

12. A control device for pressure-operated gear shifting mechanism including a valve for controlling the supply of shifting pressure to the shifting mechcanism, actuating means for the valve, control means operable by the shifting pressure controlling the closing of the valve, a pressure supply line, and pressure operated valve means operated by pressure supplied by said line when the shifting pressure control valve is open to temporarily cut off the supply of shifting pressure to said control means.

13. A control device for pressure-operated gear shifting mechanism including a valve for controlling the supply of shifting pressure to the shifting mechanism, actuating means for the valve, locking means responsive to the shifting pressure for causing the valve to be held open for a limited time period, a pressure supply line, and pressure operated valve means operated independently of the shifting pressure by pressure supplied by said line to prevent delivery of shifting pressure to said locking means.

14. A control device for pressure-operated gear shifting mechanism including a valve for controlling the supply of shifting pressure to the shifting mechanism, actuating means for the valve, and means controlling closing of the valve, said control means including a pressure-operated control member controlling closing of the valve, a line for supplying shifting pressure to operate said control member, a second pressure-operated control member controlling closing of the valve, and a second supply line adapted to supply pressure to said second control member independently of the shifting pressure.

GUSTAV MEYER.